United States Patent [19]

Ominato

[11] Patent Number: 4,737,904
[45] Date of Patent: Apr. 12, 1988

[54] STANDARD-LENGTH POSITIONING APPARATUS

[75] Inventor: Hirotaro Ominato, Tachikawa, Japan

[73] Assignees: Nikki Denso Co., Ltd., Kanagawa; Nippon Flute Co., Ltd., Tokyo, both of Japan

[21] Appl. No.: 863,584

[22] Filed: May 15, 1986

[30] Foreign Application Priority Data

Apr. 28, 1986 [JP] Japan .................................. 61-99167

[51] Int. Cl.⁴ .............................................. B26D 5/36
[52] U.S. Cl. .................................... 364/167; 364/469; 364/475; 83/71; 83/73; 83/209; 83/364; 83/365; 83/369; 83/371; 226/28
[58] Field of Search ............... 364/167, 474, 475, 469, 364/174; 83/71–74, 364, 365, 208, 209, 210, 369, 371; 226/27, 28, 30

[56] References Cited

U.S. PATENT DOCUMENTS

| | | | |
|---|---|---|---|
| 3,251,255 | 5/1966 | Bauman | 83/295 |
| 3,714,858 | 2/1973 | Lee | 83/371 |
| 3,793,915 | 2/1974 | Hujer et al. | 83/210 |
| 3,948,125 | 4/1976 | Hujer et al. | 83/208 |
| 3,967,518 | 7/1976 | Edwards | 83/365 |
| 4,056,024 | 11/1977 | Baert et al. | 83/371 |
| 4,161,899 | 7/1979 | Strune | 83/71 |
| 4,384,500 | 5/1983 | Friberg | 364/475 |
| 4,387,614 | 6/1983 | Evans | 83/76 |
| 4,415,978 | 11/1983 | Craemer et al. | 364/475 |
| 4,519,868 | 5/1985 | Hoffman | 226/28 |
| 4,697,485 | 10/1987 | Raney | 83/365 |

Primary Examiner—Jerry Smith
Assistant Examiner—John R. Lastova
Attorney, Agent, or Firm—James E. Nilles; Nicholas A. Kees

[57] ABSTRACT

A standard-length positioning apparatus wherein acceleration and deceleration of a driving mechanism for actuating a mechanism for feeding a material is controlled by a digital positioning mechanism according to a position feedback. Marks marked on the material are read by a sensor during the deceleration of the driving mechanism, and the digital positioning mechanism outputs a signal for stopping the driving mechanism when it receives the read-in output of the sensor while the driving mechanism is being decelerated. When a signal from the sensor is not received by the digital positioning means while the drive is being decelerated, the digital positioning mechanism utilizes feedback pulses of a positioning detector to stop the drive.

8 Claims, 2 Drawing Sheets

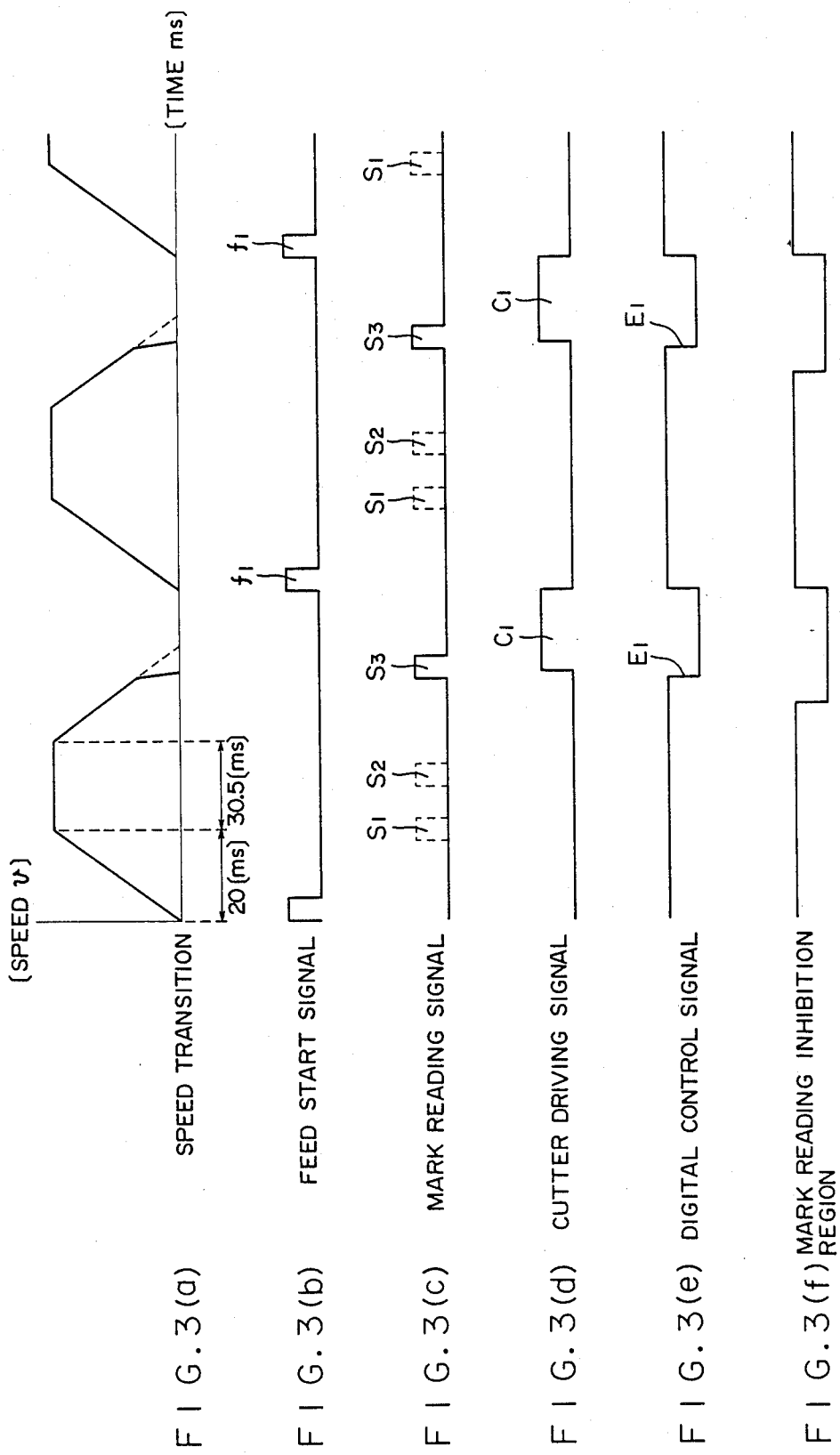

STANDARD-LENGTH POSITIONING APPARATUS

BACKGROUND OF THE INVENTION

1. Field of the Invention

The present invention relates to a standard-length positioning apparatus, and more particularly to a standard-length positioning apparatus suitable for use with an automated machine or the like which positions a continuous long material every predetermined dimension to process the same.

2. Description of the Prior Art

Generally, where a continuous long material is positioned every predetermined dimension to process the same as in a cutter, a printing machine, an automatic inserting machine and the like, a standard-length positioning apparatus adapted to stop the material every predetermined dimension is used.

The standard-length positioning apparatus of this kind most frequently used in the past is relied upon mark sensing. This apparatus is designed so that marks marked on the material every predetermined dimension are detected by a detector, for example, such as a photoelectric tube, a magnetic sensor or the like or a limit switch to stop a drive mechanism for feeding a material by the detection signal therefrom.

Recently, a digital positioning mechanism adapted to provide for positioning by a position feedback signal, without use of the above-described mark sensor, has been put into wide use.

However, any of these prior art apparatuses have inconveniences for use as a standard-length positioning apparatus. That is, in the former mark reading system, if, for example, reading error in mark should occur, the positioning would become impossible to carry out no stopping operation, resulting in feeding of exceeding materials. In addition, if patterns or scratches of the material other than marks are read, the stopping operation possibly takes place at a site not expected at all. Moreover, for example, if the machine is speeded up, the reading precision for marks has to be materially increased, which inevitably increases the cost, and there is a limitation in connection with the positioning precision including the increase in inertia moment of the machine resulting from the speed-up. In order that after detection of a mark, the drive mechanism is stopped by the detection signal, the mechanical strength of other parts including the drive mechanism should be made more rigid and there is a limitation in large-sized structure as well as speed-up structure.

On the other hand, where the latter digital positioning mechanism is used, extremely high speed positioning becomes possible since the detection of mark need not be required. However, the positioning takes place without confirmation of a position of the material, and therefore, there occurs an inconvenience where, for example, positioning of material having printed matter, patterns or the like or material for which strict precision is required takes place. This is because of the fact that uncalculatable primary factors of errors in slip, deformation, precision environmental conditions of machineries and/or materials cannot be ignored even if the position feedback pulse is strictly set.

Furthermore, in view of the above-described problem, as a standard-length positioning apparatus which comprises a combination of a digital positioning and a mark sensing, a method as disclosed in Japanese patent Laid-Open No. 217,560/1984, for example, has been proposed. This apparatus comprises a first counter which counts pulses according to the amount of feed of material simultaneously with the start of the material and a second counter which counts predetermined time after marks marked on the material have been detected, whereby stop postioning is carried out by the output of the second counter. According to this structure, the stopping operation is basically carried out by detection of the mark, and therefore the positioning precision may be enhanced as compared with the control of digital positioning alone but the reading of mark is done during the high-speed operation, which the disadvantage with respect to the above-mentioned mark reading system remains unsolved. In addition, a further counter is necessary to be provided in addition to a normal counter, and therefore the control circuit becomes complicated to increase the cost. Moreover, in order that after reading the mark, a distance is set for proving a smooth falling, there involves a practical inconvenience in that the set value of the second counter cannot be made to a level below a predetermined value.

Incidentally, the mark reading system has a further significant problem in addition to the problems in terms of mechanism such as the responsiveness to speed-up, reading error and the like as described above. More specifically, where positioning of material having printed matter, patterns and the like is carried out, when a printed matter is present between marks, it is not possible to discriminate the printing from the mark, as a consequence of which positioning becomes impossible. Moreover, the provision of marks for purpose of reading other than the designed printing and patterns on the material as described is very conspicuous in case of material having a specific design, and involves an inconvenience in that the visual aesthetics is impaired.

As mentioned above, the conventional standard-length positioning apparatus has problems in view of malfunction, speed-up operation and the like.

SUMMARY OF THE INVENTION

The present invention has been proposed to overcome the aforementioned problems, and an object of the invention is to render possible the positioning every predetermined dimension, that is, the standard-length positioning very positively without malfunction.

It is a further object of the invention to enable positive reading of marks even when material is fed at extremely high speeds, and to enable positioning operation even if reading of marks on the fed material becomes impossible due to the occurrence of unexpected trouble.

It is another object of the invention to minimize the error in feed of material to render the positioning with high precision possible.

It is another object of the invention to provide an arrangement wherein particularly when material having printed matter or patterns is subjected to positioning operation, the printing, patterns and marks may be discriminated positively and the positioning operation may proceed, in which case, part of printing and patterns may be used as marks without particularly marking marks on the material.

A standard-length positioning apparatus according to the present invention comprises a driving mechanism for actuating a mechanism for feeding a material, a digital positioning mechanism for controlling acceleration and deceleration of the driving mechanism by a position feedback, and a sensor for reading marks marked on said material and outputting a signal therefrom to said digital positioning mechanism, and in which said sensor is set so that the mark on the material is read at the deceleration of said driving mechanism and said digital positioning mechanism outputs a signal for stopping said driving mechanism simultaneously with the read-in output of said sensor.

In accordance with the present invention, the driving mechanism is subjected to acceleration and deceleration by means of the digital positioning mechanism, the sensor reads the mark on the material under the state where the driving mechanism is in the deceleration, and at the same time the driving mechanism is stopped by the digital positioning mechanism to stop the material at a feed position of a predetermined dimension.

Other objects and features of the present invention will be described in detail with reference to the accompanying drawings.

BRIEF DESCRIPTION OF THE DRAWINGS

FIGS. 3(a) to 3(f) are time charts showing the control state.

DESCRIPTION OF THE PREFERRED EMBODIMENT

A preferred embodiment in which the present invention is applied to a high-speed bag-making cutting apparatus will be described in detail with reference to the drawings.

Figure 1:
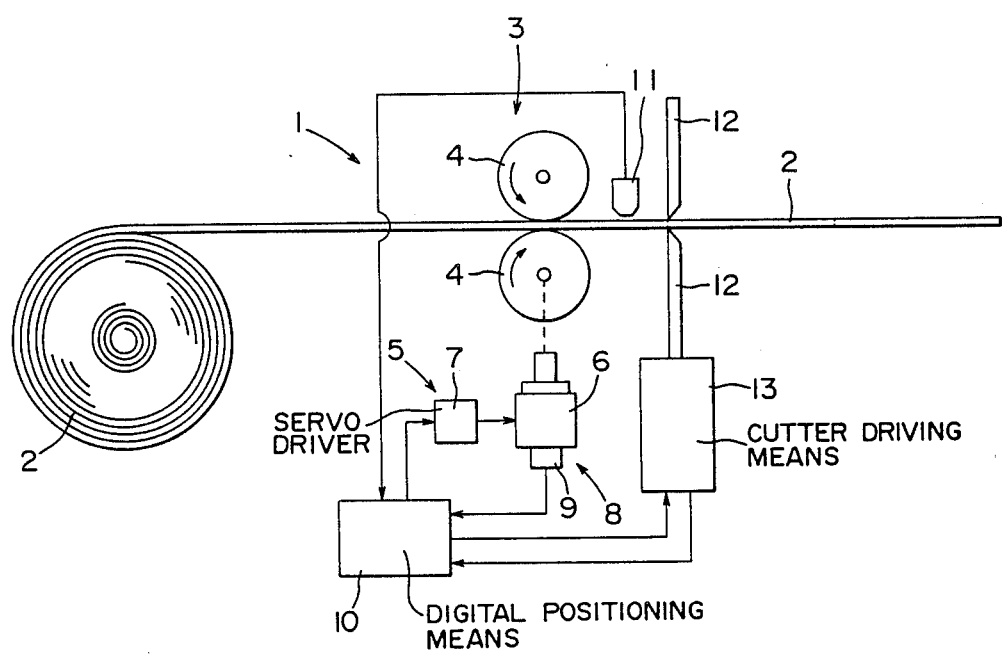
FIG. 1 is a structural view showing one embodiment in which a standard-length positioning apparatus according to the present invention is applied to a cutting apparatus for making bags.
Figure 2:
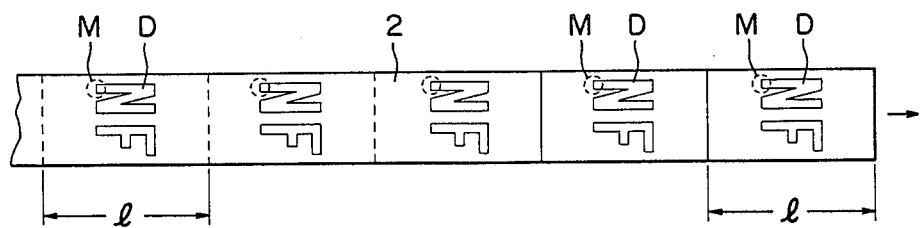
FIG. 2 is a plan view showing a sheet of plastic which forms a material to be fed.

FIG. 1 shows a high speed bag-making cutting apparatus generally indicated at 1. Reference numeral 2 designates a long synthetic resin sheet which is a feed material. The sheet 2 forms a raw material for bags and comprises a tubular body formed of a thin synthetic resin film, said tubular body being formed into a flat configuration, which surface is pre-printed with indications D such as suitable characters, figures, patterns and the like at regular intervals. More specifically, the indications D are printed and arranged at regular intervals in such a manner that the sheet 2 is cut every predetermined dimension l, for example, 500 mm. Acknowledged points at predetermined positions of the indications D are determined as marks M for read-in marks. In FIG. 1, reference 3 designates a feed mechanism which comprises a pair of upper and lower feed rollers 4, 4, which hold the sheet there-between to feed it. The feed rollers 4, 4 are mechanically connected to a standard-length positioning apparatus 5. The standard-length positioning apparatus 5 is composed of a driving mechanism 8 comprising a motor 6 and a servo driver 7, a digital positioning mechanism 10 for controlling acceleration and deceleration of the driving mechanism 8 by a feedback pulse of a position detector 9 connected to the motor 6, and a sensor 11 for reading the mark M specified at a part of the indication D of the sheet 2. Reference numeral 12 designates a cutter, which is driven by a cutter driving mechanism 13.

Next, operation and function of the above-described embodiment will be described in detail with reference to FIG. 3.

First, the feed original returning operation will be described, and more specifically, the feed start position is adjusted. Then, the start switch not shown is operated. By this operation, the digital positioning mechanism 10 outputs an acceleration command signal to the servo driver 7, and the motor 6 starts its rotation by said signal. At the same time, the rollers 4, 4 of the feed mechanism 3 mechanically connected to the shaft of the motor 6 also rotate. The sheet 2 starts to be fed by rotation of the rollers 4, 4. At this time, the position detector 9 connected to the motor 6 also rotates with the motor 6 to output a position feedback pulse to the digital positioning mechanism 10. The digital positioning mechanism 10 outputs a digital control signal for driving the driving mechanism 8 as shown in FIG. 3 (e) according to the number of the feedback pulses. For example, in case the illustrated embodiment, the number of pulses is set so that acceleration time is 20 ms and constant speed driving time is 30.5 ms as shown in FIG. 3 (a). When the prescribed number of pulses is reached, the digital positioning mechanism 10 outputs a deceleration command to the driving mechanism 8. The motor 6 starts its deceleration by said signal. On the other hand, the sensor 11 always monitors the indication D of the sheet 2 but a mark-reading inhibit area is set in the digital positioning mechanism 10 as shown in FIG. 3 (f), and therefore any input of read-in signal is cancelled. Accordingly, in this area, even if read-in signals $S_1$, $S_2$ are generated by the sensor 11 as shown in FIG. 3 (c), they are ignored. When the prescribed number of pulses is reached, the positioning mechanism 10 outputs a deceleration command to the driving mechanism 8 and the motor 6 is decelerated. At this time, that is, at the time of low-speed driving, the sensor 11 precisely and accurately detects the mark M of a part of the indication D as a read-in signal $S_3$ shown in FIG. 3 (c). The thus detected read-in signal $S_3$ is outputted to the digital positioning mechanism 10, and the driving mechanism 8 is released from the digital control caused by the feedback pulse as shown in FIG. 3 (e). Then the digital positioning mechanism 10 outputs a stop command $E_1$ to the driving mechanism 8 and the motor 6 rapidly stops. Simultaneously with said operation, a cutter driving signal $C_1$ shown in FIG. 3 (d) is outputted from the digital positioning mechanism 10 to the cutter driving mechanism 13. The cutter 12 is driven by said signal to cut the sheet 2. Upon termination of the cutting operation, the cutting driving mechanism 13 outputs a feed start signal $f_1$ to the digital positioning mechanism 10 as shown in FIG. 3 (b). By this signal, the digital positioning mechanism 10 again assumes the digital control state caused by the feedback pulse as shown in FIG. 3 (e) to accelerate the motor 6 of the driving mechanism 8.

If during the above-described operation, reading of the mark M on the sheet 2 should be disabled due to an error in print or the like, $S_3$ shown in FIG. 3 (c) is not generated and therefore the digital control is not released. Accordingly, the digital control is continuously carried out and therefore, the stop control is also carried out by the digital positioning mechanism 10 similarly to the acceleration and constant speed driving control. That is, the digital positioning mechanism 10 causes the driving mechanism 8 to stop by the position feedback, and the cutter driving signal $C_1$ is outputted similarly to the time when the mark is read and the cutting operation is continued.

While in the above description, a preferred embodiment to which the standard-length positioning apparatus of the present invention is applied has been described taking a high speed bag-making cutter as an example, it is to be noted that the invention is not limited thereto but can be applied to any of structure which need to perform positioning every predetermined dimension. Furthermore. while in the aforementioned embodiment, an acknowledged point of a part of an indication D has been used as a mark M, it is also to be noted that the mark M can be a separate one for the purpose of being read irrespective of the indication D such as characters, figures, patterns, etc.

Effects of the Invention

As described above, according to the standard length positioning apparatus of the present invention, a mark is read when the feed material is decelerated, and therefore, the mark reading precision is remarkably enhanced, and the reading error is materially reduced. Furthermore, a mark is read at the low speed during deceleration, and therefore, a relatively inexpensive sensor can be used. Moreover, at the time other than reading, feed-driving can be made at super high speed by the digital positioning mechanism, and therefore, even in combination of the apparatus with various machine tools, processing speed is enhanced materially. Since the digital positioning is released by the mark reading signal to stop the driving device, additive circuits or complicated circuits are not necessary and the apparatus is simple and can be manufactured at low cost. In addition, even if reading of a mark on the feed material is impossible, the driving apparatus is stopped by the digital positioning apparatus and therefore exceeding sheet is never fed and the positive positioning can be made.

Moreover, where positioning of materials having prints, patterns or the like is carried out, the sensor will not read the prints or patterns mixed in the mark to be read, if any, in the mark reading inhibit area, and therefore, no possible confusion of mark occurs. In the aforesaid mark reading inhibit area, the effect of non-reading any sign may be utilized to use a part of the print and pattern as a substitute of a mark. In this case, a mark merely for the purpose of reading impairing design properties other than prints and patterns need not be marked and therefore the visual aesthetical properties will not be impaired at all.

What is claimed is:

1. A standard length positioning apparatus for controlling a mechanism for feeding a material, and thereafter operating on said material, comprising;
  A. a driving mechanism for actuating said feeding mechanism,
  B. a digital positioning mechanism for controlling acceleration and deceleration of the driving mechanism by means of feedback pulses from a position detector, and
  C. a sensor for reading marks marked on said material and outputting a signal therefrom to said digital positioning mechanism,
  D. said digital positioning mechanism including:
    (1) means for ignoring said signal from said sensor unless said driving mechanism is being decelerated, and
    (2) means for outputting a signal for stopping said driving mechanism and for operating on said material upon receiving said signal from said sensor while said driving mechanism is being decelerated,
    (3) said digital positioning mechanism further including means for outputting a signal for stopping said driving mechanism and for operating on said material when a signal from said sensor is not received by said digital positioning mechanism while said driving mechanism is being decelerated.

2. The standard-length positioning apparatus as set forth in claim 1, wherein the feed material comprises a synthetic resin sheet.

3. The standard length positioning apparatus as set forth in claim 1, wherein a portion of an indication provided on the feed material is used as the mark to be read.

4. The standard length positioning apparatus as set forth in claim 1 which comprises a cutter actuated by the digital positioning mechanism for operating on the feed material by cutting the feed material when the feed material has stopped.

5. A standard-length positioning apparatus comprising a driving mechanism consisting of a motor and a servo driver for actuating a mechanism for feeding a material and thereafter operating on said material, a digital positioning mechanism for controlling acceleration and deceleration of the driving mechanism by means of feedback pulses from a position detector, and a sensor for reading marks on said material and for outputting a signal therefrom to said digital positioning mechanism, characterized in that said sensor includes means for being disabled from sensing the mark on the material at all times other than when said driving mechanism is decelerated, said digital positioning mechanism including means for outputting a signal for stopping said driving mechanism and operating on said material simultaneously with the read-in ouput of said sensor, said digitial positioning mechanism further including means for outputting a signal for stopping the driving mechanism and for operating on said material solely based on the feedback pulses from the position detector when a mark on the feed material is not detected.

6. The standard-length positioning apparatus as set forth in claim 5, wherein the feed material comprises a synthetic resin sheet.

7. The standard-length positioning apparatus as set forth in claim 5, wherein a portion of an indication provided on the feed material is used as the mark to be read.

8. The standard-length positioning apparatus as set forth in claim 5, which comprises a cutter actuated by the digital positioning mechanism for operating on the feed material by cutting the feed material when the feed material has stopped.

* * * * *